United States Patent
Bishop

(10) Patent No.: US 10,487,516 B2
(45) Date of Patent: Nov. 26, 2019

(54) RELATING TO A VISIBLE FLEXIBLE FACING LAYER

(71) Applicant: Paul James Bishop IP Holdings Limited, Birmingham (GB)

(72) Inventor: Paul James Bishop, Gloucestershire (GB)

(73) Assignee: Paul James Bishop IP Holdings Limited, Birmingham (GB)

(*) Notice: Subject to any disclaimer, the term of this patent is extended or adjusted under 35 U.S.C. 154(b) by 0 days.

(21) Appl. No.: 16/083,815

(22) PCT Filed: Mar. 10, 2017

(86) PCT No.: PCT/GB2017/050642
§ 371 (c)(1),
(2) Date: Sep. 10, 2018

(87) PCT Pub. No.: WO2017/153767
PCT Pub. Date: Sep. 14, 2017

(65) Prior Publication Data
US 2019/0112821 A1    Apr. 18, 2019

(30) Foreign Application Priority Data
Mar. 11, 2016 (GB) .................................. 1604209.5

(51) Int. Cl.
*E04F 13/14*    (2006.01)
*B32B 5/02*    (2006.01)
(Continued)

(52) U.S. Cl.
CPC .............. *E04F 13/147* (2013.01); *B32B 3/16* (2013.01); *B32B 3/26* (2013.01); *B32B 5/022* (2013.01);
(Continued)

(58) Field of Classification Search
CPC ...... E04F 13/147; E04F 13/0862; B32B 3/26; B32B 27/12; B32B 5/022; B32B 5/024;
(Continued)

(56) References Cited

U.S. PATENT DOCUMENTS 3,312,761 A    4/1967 Vida
4,288,486 A *  9/1981 Ferment ............... D06N 7/0007
                                                    427/244

(Continued)

FOREIGN PATENT DOCUMENTS

CH        512322 A    9/1971
CN     203174961 U    9/2013
(Continued)

OTHER PUBLICATIONS

British Search Report dated Aug. 26, 2016 for related British Patent Application No. GB1604209.5, 1 page.

(Continued)

*Primary Examiner* — Jeanette E Chapman
(74) *Attorney, Agent, or Firm* — Hovey Williams LLP

(57) ABSTRACT

A method of forming a visible flexible facing layer for creating a visible appearance of a facing wall-surface of a walled structure, comprises the steps of: a] providing a flexible porous support substrate on a support; and b] creating a wet mixture using a powdered aggregate. A further step c] applies the wet mixture to the flexible support substrate using a control template to form a plurality of spaced-apart wall-tile slips which at least in part permeate the flexible porous support substrate; and step d] cures the wall-tile slips to the flexible porous support substrate to form a tile sheet of the visible flexible facing layer. A step e] folds the visible flexible facing layer for storage and/or transportation. A method of matching existing brick-or stone-work (Continued)

of a wall of a building to a visible flexible facing layer, and a visible flexible facing layer are also provided.

18 Claims, 8 Drawing Sheets

(51) Int. Cl.
  *B32B 5/24* (2006.01)
  *B32B 5/30* (2006.01)
  *B32B 3/16* (2006.01)
  *E04F 13/08* (2006.01)
  *B32B 27/12* (2006.01)
  *B32B 3/26* (2006.01)
(52) U.S. Cl.
  CPC ............ *B32B 5/024* (2013.01); *B32B 5/24* (2013.01); *B32B 5/30* (2013.01); *B32B 27/12* (2013.01); *E04F 13/0862* (2013.01); *B32B 2260/025* (2013.01); *B32B 2260/046* (2013.01); *B32B 2262/023* (2013.01); *B32B 2262/0253* (2013.01); *B32B 2262/062* (2013.01); *B32B 2262/08* (2013.01); *B32B 2264/10* (2013.01); *B32B 2307/4026* (2013.01); *B32B 2307/546* (2013.01); *B32B 2307/554* (2013.01); *B32B 2307/714* (2013.01); *B32B 2307/72* (2013.01); *B32B 2307/724* (2013.01); *B32B 2307/7265* (2013.01); *B32B 2419/04* (2013.01); *B32B 2451/00* (2013.01); *B32B 2553/00* (2013.01); *B32B 2607/02* (2013.01)
(58) Field of Classification Search
  CPC .... B32B 3/16; B32B 5/30; B32B 5/24; B32B 2607/02; B32B 2451/00; B32B 2419/04; B32B 2307/7265; B32B 2307/714; B32B 2307/554; B32B 2307/546; B32B 2307/4026; B32B 2264/10; B32B 2262/08; B32B 2262/062; B32B 2262/0253; B32B 2262/023; B32B 2260/046; B32B 2260/025; B32B 2553/00

See application file for complete search history.

(56) References Cited

U.S. PATENT DOCUMENTS

| | | | |
|---|---|---|---|
| 4,741,947 A | * | 5/1988 | Pataki ................. C09J 163/00 428/211.1 |
| 6,237,294 B1 | | 5/2001 | Rygiel |
| 2002/0100241 A1 | | 8/2002 | Rygiel |
| 2010/0173070 A1 | * | 7/2010 | Niu ..................... B01D 39/083 427/215 |
| 2018/0051155 A1 | * | 2/2018 | Nair ..................... C08J 9/236 |

FOREIGN PATENT DOCUMENTS

| | | |
|---|---|---|
| DE | 2136870 A1 | 7/1971 |
| GB | 2072156 A | 9/1981 |
| GB | 2339807 A | 2/2000 |
| GB | 2525249 A | 10/2015 |
| WO | 2015159075 A1 | 10/2015 |

OTHER PUBLICATIONS

International Search Report dated Jun. 22, 2017 for related PCT Patent Application No. PCT/GB2017/050642, 6 pages.
International Preliminary Report on Patentability for related Patent Application No. PCT/GB2017/050642, 8 pages.

* cited by examiner

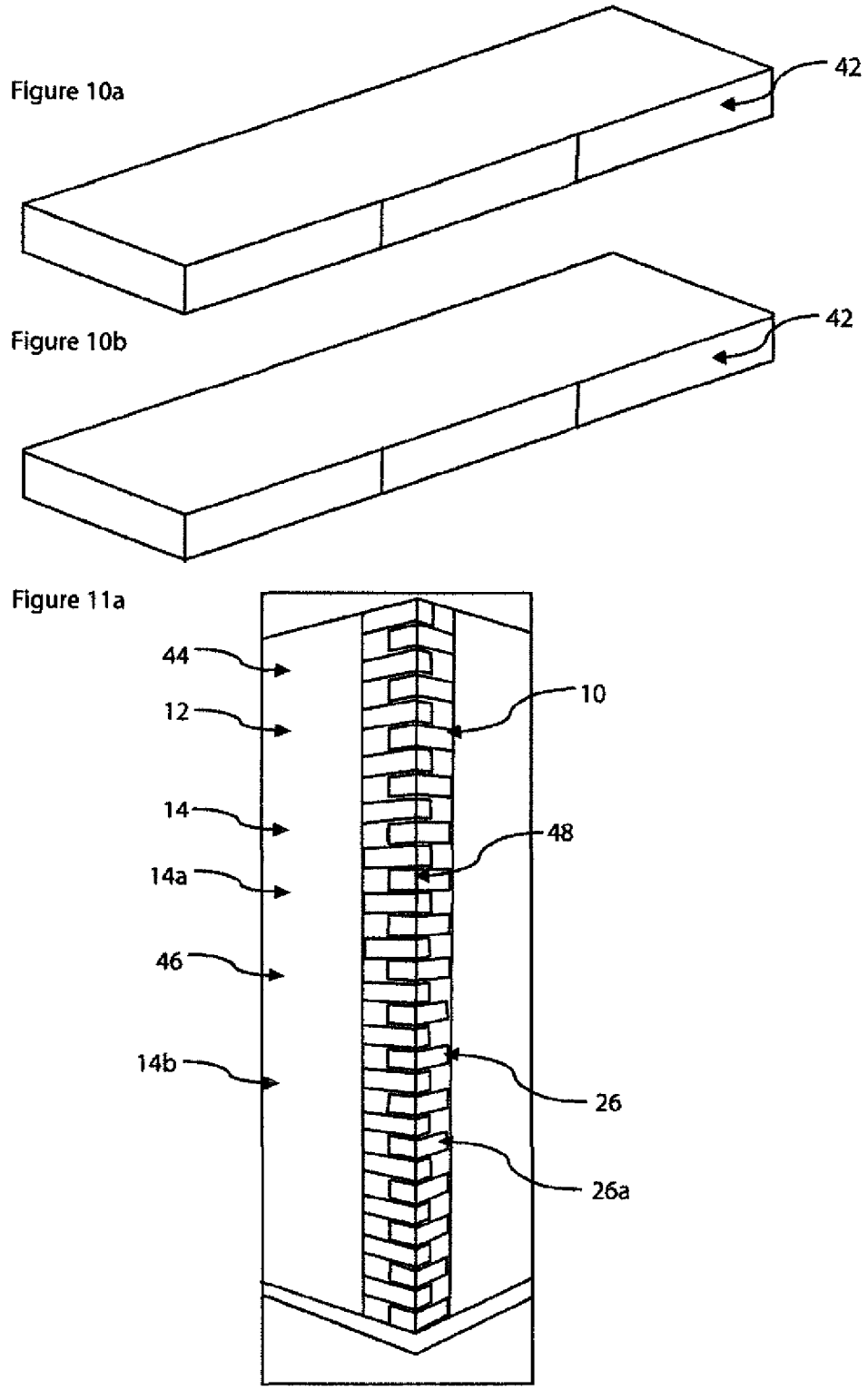

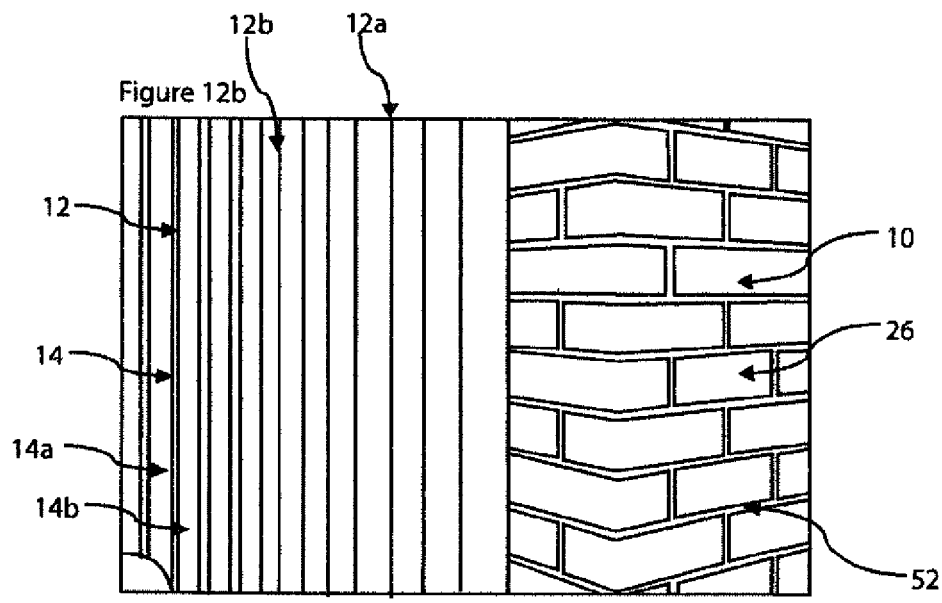

RELATING TO A VISIBLE FLEXIBLE FACING LAYER

RELATED APPLICATIONS

This application is a national stage application, under 35 U.S.C. § 371 of International Patent Application No. PCT/GB2017/050642, filed on Mar. 10, 2017 and published as WO 2017/153767 on Sep. 14, 2017, which claims priority to Great Britain Application No. 1604209.5 filed Mar. 11, 2016, which are hereby incorporated by reference in their entirety.

The present invention relates to a method of forming a visible flexible facing layer for creating a visible appearance of a facing wall-surface of a walled structure, to a method of matching or substantially matching existing brick- or stone-work of a wall of a building to a visible flexible facing layer, and to a visible flexible facing layer for creating a visible appearance of a facing wall-surface of a walled structure and, preferably, formed using such a method. The invention may furthermore relate to a cladding system, particularly but not necessarily exclusively, for an exterior or interior wall of a structure, which may typically be a building.

Cladding for buildings, such as domestic and commercial premises, is known, and traditionally comes in individual tiles which are laboriously applied by hand to the exterior wall of the building, before then being grouted. However, the tiles first have to be produced, and these may either be moulded plastics, which are low-cost and have minimal longevity, or may be sliced from pre-manufactured brick. This latter case is hugely wasteful, since only the outer surface is required and thus around 90% of the brick is then discarded, typically being disposed of in landfill.

Other options for cladding exist, such as plaster or render stucco material. However, such outer layers on buildings are prone to cracking over a relatively short period of time due to the impact of seasonal climate change, along with relatively rapid fading.

Furthermore, current cladding is highly repetitious, leading to a clearly unnatural finish and one which cannot be matched to the surrounding built and historical environment.

It is known to provide panelled cladding for a building, wherein an outwardly facing layer of the cladding can be matched to the finish of the building. However, rigid panels can only be integrated onto surfaces with certain characteristics. If the visible walls of a building, whether these are interior or exterior, are in a state of disrepair, for instance, it may not be possible to apply a rigid panel which displays a natural finish. This can be a significant problem for the restoration of historic buildings, where the walls may not have entirely uniform features.

Furthermore, known cladding is rigid, which makes it particularly difficult to extend the cladding around corners of the surface or accommodating undulations or unevenness in the surface. Additionally, known cladding is only provided in single or separate tiles, making it a laborious job to apply, along with making packaging, storage, transportation and/or unpacking troublesome. The separate tiles also therefore require additional spacers when being applied to provide correct alignment and spacing relative to each other.

Another issue occurs when fastening exiting cladding to the structure. Following extended periods of damp or humid weather, moisture can become trapped behind the cladding. On periods of cold or freezing weather, the expansion of the moisture turning to ice can lead to delamination of the cladding.

It has also been problematic to achieve a consistent area and volume of the tiles to be used as cladding.

The present invention seeks to overcome all of these problems.

According to a first aspect of the invention, there is provided a method of forming a visible flexible facing layer for creating a visible appearance of a facing wall-surface of a walled structure, the method comprising the steps of: a] providing a flexible porous support substrate on a support; b] creating a wet mixture using a powdered aggregate formed at least in part from solid particulate material and mixed with a binding agent; c] applying the wet mixture to the flexible support substrate using a control template to form a plurality of spaced-apart wall-tile slips which at least in part permeate the flexible porous support substrate; d] curing the wall-tile slips to the flexible porous support substrate to form a tile sheet of the visible flexible facing layer having flexible wall-tile slips; and e] folding the visible flexible facing layer for storage and/or transportation.

It is an object of the invention to provide a versatile façade for a building which has a brick-, rock- or stone-work effect, which can be readily applied to a surface, such as an exterior or interior wall, of a structure, such as a building, without obviously altering the overall appearance of the structure. Given that many structures do not necessarily have perfectly planar exterior walls, the flexibility of the visible flexible facing layer allows for it to be adhered to non-planar surfaces or severely undulating surfaces which may not be able to accept panelled cladding.

The flexibility of the visible flexible facing layer, which may be considered to be a cladding wrap, enables a variety of different surfaces to be repairable or renovated in an aesthetically fitting manner, keeping the overall appearance of the structure or building the same during cladding application. The visible flexible facing layer can also be used to create a new overall aesthetic appearance for a building, in particular a building having unusual contours.

The visible flexible facing layer is easily applied to a support surface, since it can be rolled out or unfurled from its packaging, with the tile slips being light and easily manipulated. The flexibility of the visible flexible facing layer also increases its versatility when compared with rigid cladding panels.

Using rigid cladding panels, as are known in the field of the art, it is possible to create contours by scoring the rear faces of said rigid panels. However, there is clearly a limit to the contouring achievable using such panels, and some shapes will evidently not be possible to manufacture. A visible flexible facing layer with flexible tile slips circumvents this issue.

By using an absorbent and/or porous substrate, the underlying brick, rock or stone of the surface, typically being an exterior wall, is able to breathe through the visible flexible facing layer, whilst retaining a traditional-built or authentic appearance. This inhibits the build-up of damp or mould in the brick- or stone-work, which may otherwise occur with historic or older buildings.

The powdered aggregate may be untreated 'as dug' reclaimed material, and/or recycled from castoff solid inorganic material, and may be at least one of brick, stone and rock.

The powdered aggregate forms at least in part, and preferably at least a majority, of the visible surface of the tile slips, which in this case is the externally facing layer of the visible flexible facing layer, that is, the exterior, visible face. Therefore, it is preferable to use a powdered aggregate which is formed from substantially the same material as is already in use on the building or structure to be clad, or on similar buildings in the locale. The majority of buildings requiring renovation are built from brick or stone, and therefore it is advantageous to provide a visible flexible facing layer using at least these components in the powdered aggregate.

A polymeric binding agent, in particular a resin-based agent, is advantageous for use in the visible flexible facing layer, since it is sufficiently adhesive to bond the layers together, whilst being sufficiently viscous to permeate through a porous layer. The binding agent is also weather resistant, which is a primary concern for an exterior cladding.

It is advantageous to provide the flexible facing layer as a plurality of tiles, fashioned to replicate the appearance of bricks, rocks or stones, for example, to give the appearance of continuity with the existing aesthetic of the building. Typically, brickwork may be arranged in a pyramidal lattice-like configuration, with gaps between each brick of 10 mm to 20 mm.

A grouting layer or seam may itself be flexible or elastic enabling deforming without or substantially without cracking or splitting.

Following on from a brickwork arrangement, it is beneficial to maintain the aesthetic of a real brickwork wall or surface by adding a grouting layer in between tiles, since this will further create the illusion that the cladding wrap is in fact a part of the existing building structure. By using grouting for this purpose, rather than traditional cement and/or lime compounds, the dangers of efflorescence and lime bloom are mitigated.

The use of a woven material for the support substrate, such as a cotton layer is advantageous, since it is a light and flexible material. Weather resistance is conferred to the visible flexible facing layer by the powdered aggregate and, preferably, polymeric binding agent, and it is therefore beneficial to provide a light substrate. A polymeric mesh may be preferable for the backing material, since this will be adhered to a cladding panel or directly to an exterior wall or support surface, and therefore strength may be of greater concern than weight.

According to a second aspect of the invention, there is provided a method of matching or substantially matching existing brick- or stone-work of a wall of a building to a visible flexible facing layer, the method comprising the steps of: a] determining a colour scheme of existing building brick- or stone-work; b] providing a flexible porous support substrate on a support; c] creating a wet mixture using a powdered aggregate formed at least in part from solid particulate material and mixed with a binding agent; d] applying the wet mixture to the flexible porous support substrate using a control template to form a plurality of spaced-apart wall-tile slips which at least in part permeate the flexible porous support substrate; e] curing the wall-tile slips to the flexible porous support substrate to form a tile sheet of the visible flexible facing layer having flexible wall-tile slips; and f] folding the visible flexible facing layer for storage and/or transportation to the said building.

According to a third aspect of the invention, there is provided a visible flexible facing layer for creating a visible appearance of a facing wall-surface of a walled structure, and preferably formed using a method as claimed in any one of the preceding claims, the flexible facing layer comprising: a flexible porous support substrate for bonding to a user-facing wall surface; and a plurality of spaced-apart flexible wall-tile slips cured to the flexible porous support substrate, the flexible wall-tile slips being formed from a powdered aggregate at least in part of solid particulate material and mixed with a binding agent which remains flexible when set.

The invention will now be more particularly described, by way of example only, with reference to the accompanying drawings, in which:

FIGS. 10a and 10b show perspective representations of a front and a back of a container for receiving the folded visible flexible facing layer in FIG. 9;

FIGS. 11a to 11d show a method of applying the visible flexible facing layer to a walled-structure, such as a mobile corrugated steel-walled worksite cabin;

FIGS. 12a and 12b show the cabin of FIGS. 11a to 11d, with the finished cladding applied, and the contrast between the corrugated steel walling and the visible flexible facing layer.

Figure 1:
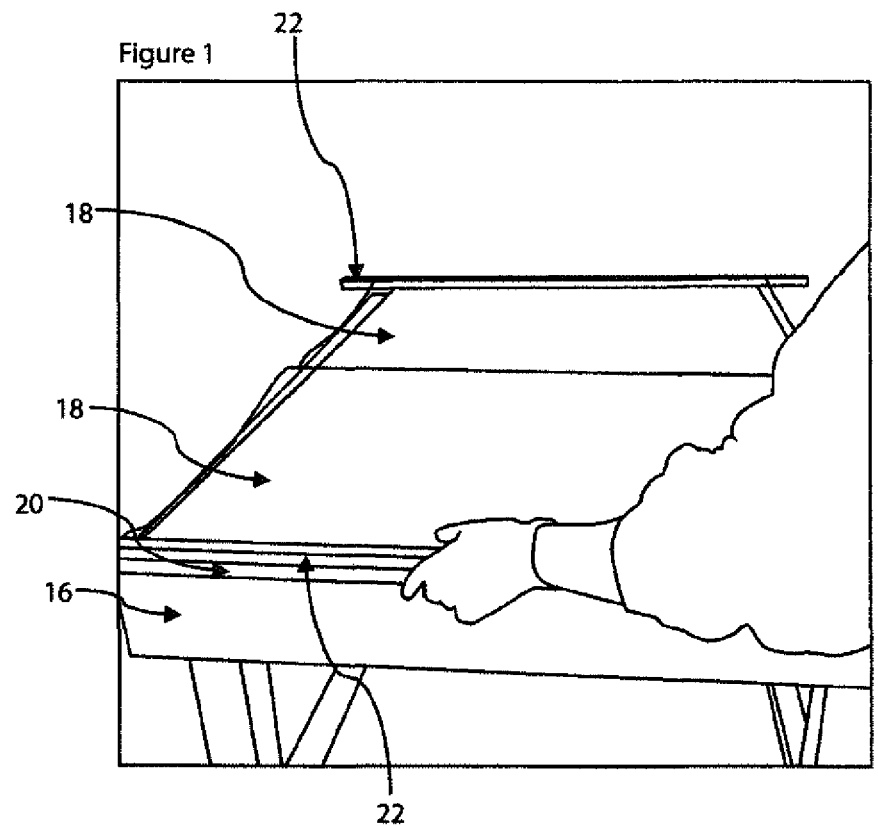
FIG. 1 shows a first step of one embodiment of a method of forming a visible flexible facing layer for creating a visible appearance of a facing wall-surface of a walled structure, in accordance with the invention, the first step relating to positioning of a flexible porous substrate on a support.

Referring to the accompanying drawings, there is shown a method of forming a visible flexible facing layer 10 for creating a visible appearance of a facing surface 12 of a structure 14. The structure 14 is preferably a building structure 14a, either being domestic or commercial, and the facing surface 12 is therefore preferably a wall surface 12a. As will be understood hereinafter, it is not preferable to utilise the flexible facing layer 10 for the facing surface of a ceiling. As such, in the described embodiment, the visible flexible facing layer 10 forms a flexible cladding wrap or sheet which is specifically adapted for facing a building wall surface and, in this embodiment, is specifically suitable for an outer surface of an exterior wall of a building.

Although an exterior wall surface 12a is suggested, the flexible cladding wrap described herein may also be utilised to face an internal wall surface.

As shown in FIG. 1, a support 16 is provided on which one or more flexible porous support substrates 18 are laid. The support 16 in this embodiment may be a continuously uniform and unbroken hard-topped flat or planar surface, for example, a table, which in this embodiment has no raised or upstanding perimeter edge 20.

As an alternative, the support may be a conveyor to enable or promote automation of the methodology.

The flexible porous support substrate 18 is a pliant woven or non-woven sheet.

Although preferably entirely flexible and/or porous, one or more portions may not be flexible and/or porous as necessity dictates. In this embodiment, the support substrate 18 may be a polymeric fibrous matrix, for instance, a polypropylene mesh, and/or natural fibre weave, such as cotton. Dimensions in this case may advantageously be 700 mm by 760 mm, but a size may vary to suit requirement. The porosity is derived from the open or substantially open fluid-, being at least liquid-, permeable weave or structure. It may also be a beneficial option for the material of the support substrate 18 to be absorbent, as will be better understood hereinafter. In any event, the most important properties of said support substrate 18 are its flexibility and that it is porous, thereby allowing percolation of a binding agent therethrough.

Although not necessarily an essential requirement, a holder 22 is provided on each support substrate 18, in this case being at or adjacent to one perimeter edge. Each holder 22 is preferably a rigid or semi-rigid elongate strip or batten to which the support substrate 18 is connected via one or more fasteners, which may be screw-threaded fasteners, nails, staples and/or adhesive.

With the support substrate 18 preferably secured to the support 16, for example, via stapling, a control template 24 is laid on an upper surface of each support substrate 18.

A release agent may be first applied to the control template 24, if required. The control template 24 controls at least a spacing between a plurality of wall-tile slips 26 to be formed. In this case, the control template 24 determines a volume of material to be utilised for each wall-tile slip 26. This is achieved by the control template 24 having a plurality of apertures 28, in this case being rectangular or substantially rectangular.

A body 30 of the control template 24 is planar or substantially planar, defining a rectangular perimeter extent. Other perimeter shapes are possible, such as square, circular or non-circular. The body 30 preferably has a uniform thickness, and in this embodiment the thickness may be in the range of 1 mm to 15 mm, and more preferably around 5 mm. With a uniform or substantially uniform thickness, a depth of each slip 26 can be controlled, and with predetermined longitudinal and lateral extents of each aperture 28, an area of each slip 26 can be controlled.

Figure 2:
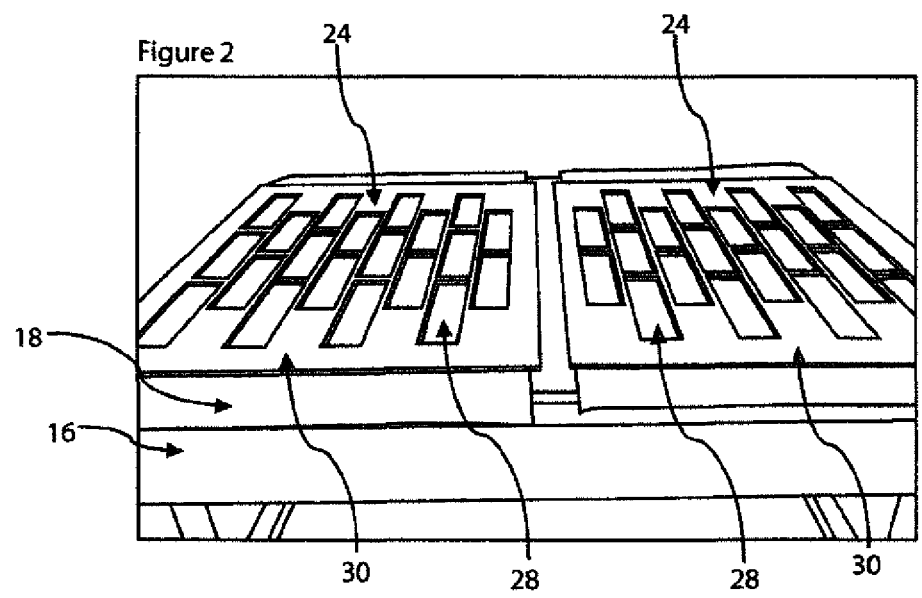
FIG. 2 shows a perspective view of two control templates provided on the flexible porous substrate and utilised in the method.

Each aperture 28 is dimensioned to match or substantially match a brick, stone or rock, dependent on an installation site of the visible flexible facing layer 10. In the embodiment shown in FIG. 2, the apertures 28 are aligned in a, preferably uniform, overlapping stacked arrangement with an equal or substantially equal spacing therebetween, equating to a typical mortar course. To provide greater realism or authenticity, the spacing between the apertures 28 may not be entirely uniform, with a tolerance variance of around 0 mm to 5 mm, and more preferably 0 mm to 2 mm.

In the current embodiment, twenty apertures 28 are provided in alternating rows of two and three apertures, lengthwisely aligned and stacked in overlapping manner whereby apertures 28 in neighbouring rows are equi-distantly bridged.

It is intended that an aperture 28 of each control template 24 houses or substantially houses material used for each slip 26, thereby providing reliable dimensional control during production. However, it is feasible that slips having irregular depths could be produced. In this case, an upper surface of the control template 24 may be non-planar.

Equally, the longitudinal and/or lateral extents of two or more of the apertures may not be matching or substantially matching, again as necessity dictates dependent on the installation site. This may be useful for stone- or rock-effect finishes or facades as opposed to a brick finish.

Figure 3:
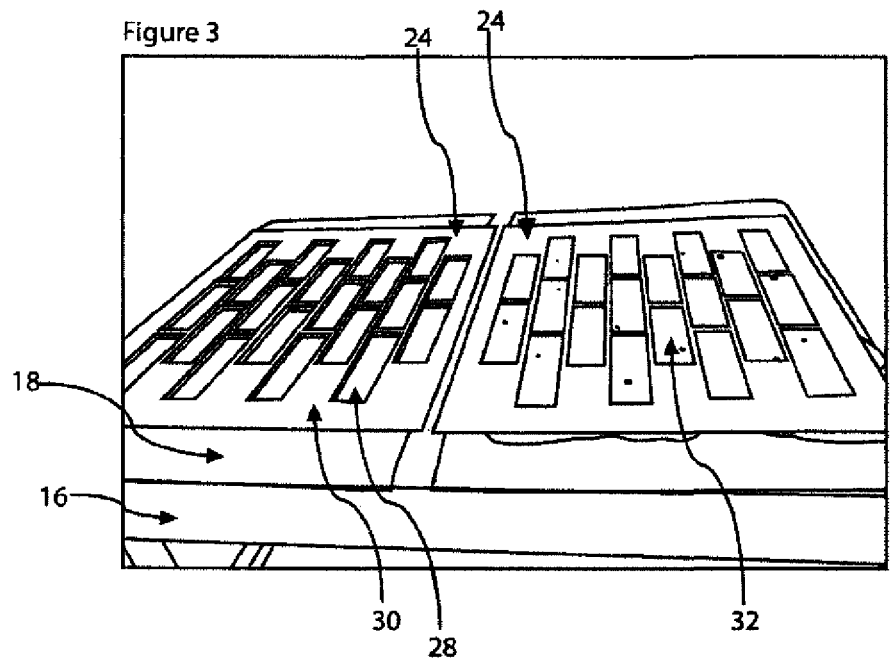
FIG. 3 shows a wet mixture including powdered aggregate applied to one of the control templates.

Referring to FIG. 3, a wet mixture 32 using a powdered aggregate 34 formed at least in part from solid particulate material and mixed with a binding agent is then created and applied to the or each control template 24. The solid particulate matter is preferably an 'as dug reclaimed' material. The term 'as dug reclaimed' is well known in the technical field, and relates to material extracted from the ground, such as a quarry, and preferably without treating is then utilised or ground to be accommodated in the wet mixture 32. The particulate matter may be inorganic or organic, and may be recycled castoff material, typically comprising at least one of brick, stone or rock. The material will be chosen primarily for its aesthetic appeal, so as to match the external appearance of the building to which it is being affixed. For example, brick and/or sandstone aggregates might be common choices for the aggregate.

Figure 4:
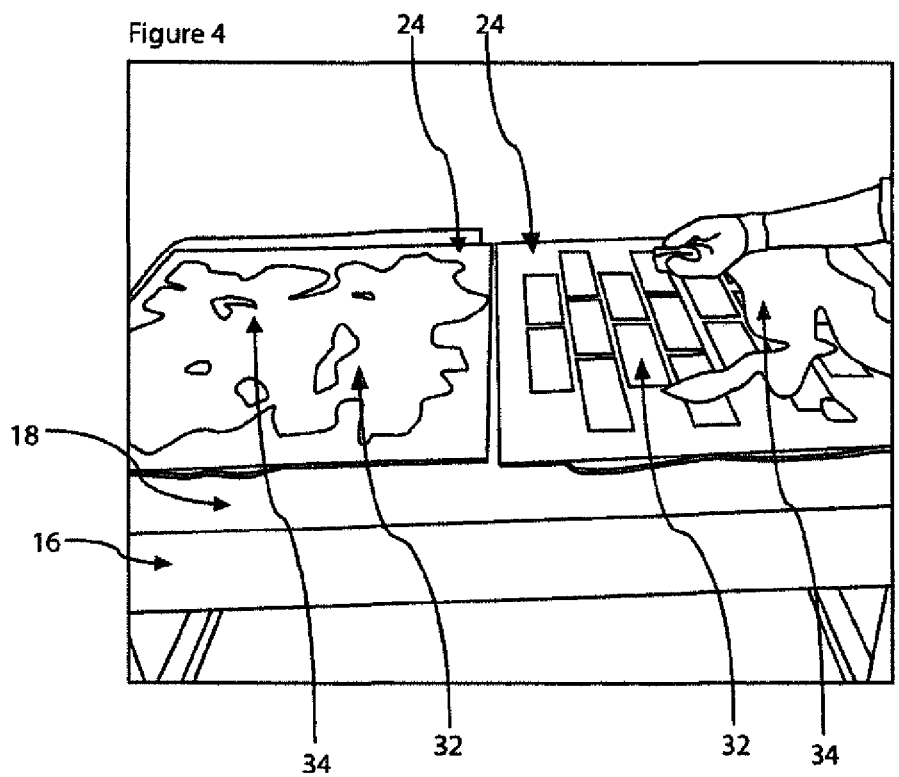
FIG. 4 shows the application of particulate matter to the wet mixture to give a required appearance.

To achieve the desired finish, thereby allowing matching or substantial matching to the building's local, historic or architectural environment and/or its original finish, the powdered aggregate 34 may be pigment colour-matched using a system similar to that used for colour matching paint or other liquid coating products. The colour scheme of a visible surface of an existing building is determined, for example, using a reflectometer, if required, and the wet mixture 32 is colour matched to the determined colour scheme by the addition of pigment. The cured wall-tile slips 26 will therefore have an authentic exterior appearance relative to the existing building, typically being brick- or stone-work. In this way, during formation of the powdered aggregate 34, the correct colour and texture of materials can be chosen to produce the required finish. By way of example, FIG. 4 shows the powdered aggregate 34 being applied as an additional layer to the wet mixture 32 in addition to being integrally formed as part thereof. This enables an option of more than one different type of powdered aggregate 34 to be utilised, thereby enabling a base colour or appearance with patches of weathering or other random anomalies appearing thereon, such as in-grained dirt or other particulate debris or detritus which ordinarily build up through years of standing in the open environment and being subjected to all kinds of weather.

However, the wet mixture may only have the powdered aggregate as an additional layer. Additionally, prior to curing the wet mixture 32, mechanical marking may also be utilised to enhance realism. For example, striation marks may be applied via a scraping device to impart peaks and troughs across an outer surface replicating slicing by a mechanical cutter. This may be a manual or automated mechanical process.

Figure 5:
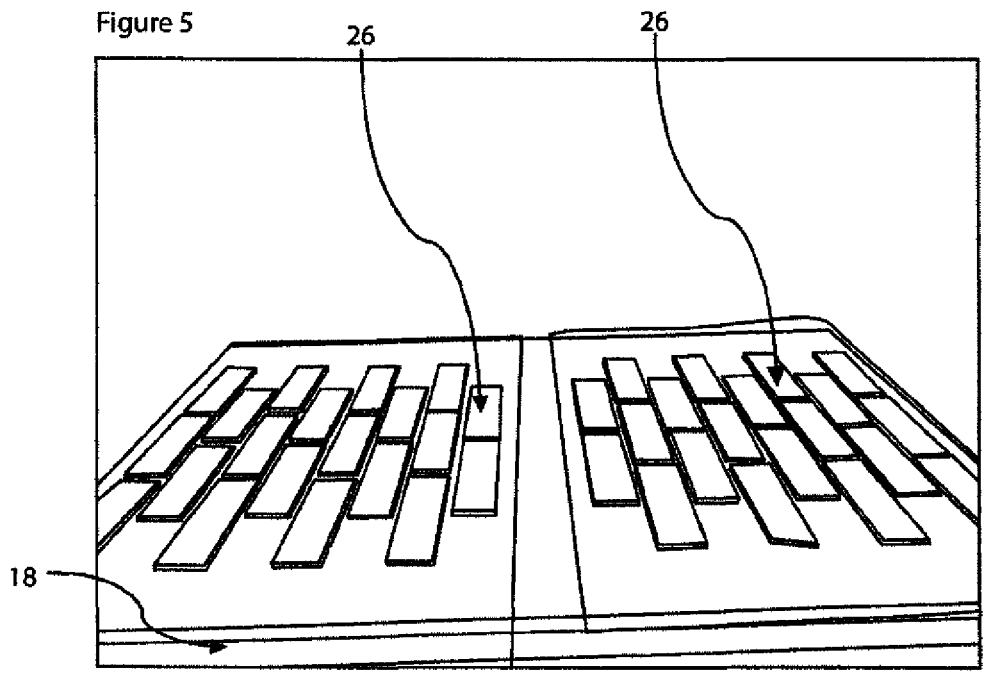
FIG. 5 shows the wet mixture with control templates removed.
Figure 6:
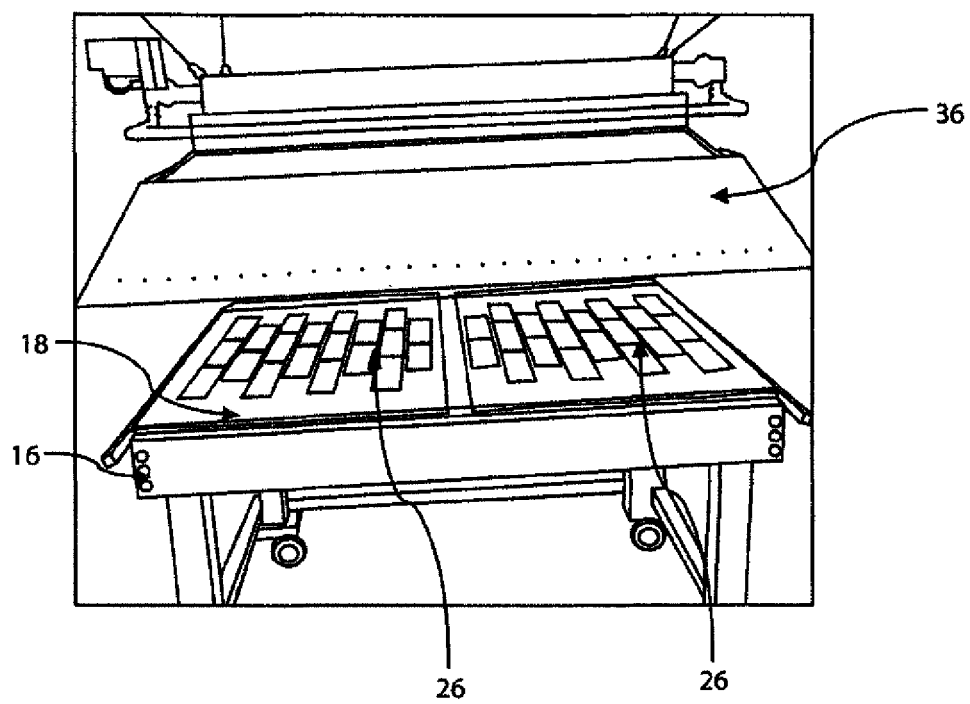
FIG. 6 shows a heating stage for setting the wet mixture and for promoting bonding to the flexible porous substrate.

The or each control template 24 is then removed, as shown in FIG. 5, and the support 16 is placed under a heating unit 36, shown in FIG. 6, to dry the wall-tile slips 26. In this case, the support 16 is preferably on castors or wheels. The heating unit may additionally or alternatively be freely movable, such as on wheels or castors, to be repositionable. A flash heat is applied for around one to two minutes, and preferably for one and a half minutes, curing at a temperature preferably in a range of 125 degrees C. to 200 degrees C., and thus forcing the presence of steam to percolate. This process ensures that the flexible tile slip 26 is fully vapour permeable allowing the visible flexible facing layer 10 to fully breath.

The binding agent may conveniently be a polymeric binding agent and/or resinous compound which preferably remains flexible or malleable once the wall-tile slips 26 are set. Again, if automating the manufacturing process, the heating unit 36 may be fixed on a production line with the template wet mixture 32 on a conveyor moving between predefined stations.

The binding agent is preferably an organic cross-linking polymeric formulation blended in part with inorganic liquid glass silicate for added density, resistance to abrasion, vapour permeability and water resistance.

The glass transition phase, T.g., can be formulated to increase or decrease its flexibility of the brick slip. This can be beneficial for hot and humid climates that require a higher glass transition phase and less flexibility, or colder clients requiring more flexibility.

The glass transition phase is not dependant on the setting or curing of the product as this is the Minimal Film Forming Time, MFFT, that typically remains unaffected or substantially unaffected.

The cross linking of organic and/or inorganic components simply allows the tile slip to determine its flexibility, density, resistance to abrasion, water resistance and most importantly the vapour permeability that allows the tile slip to remain authentic yet allows the structure, which will typically but not necessarily exclusively, to fully breath.

Figure 7:
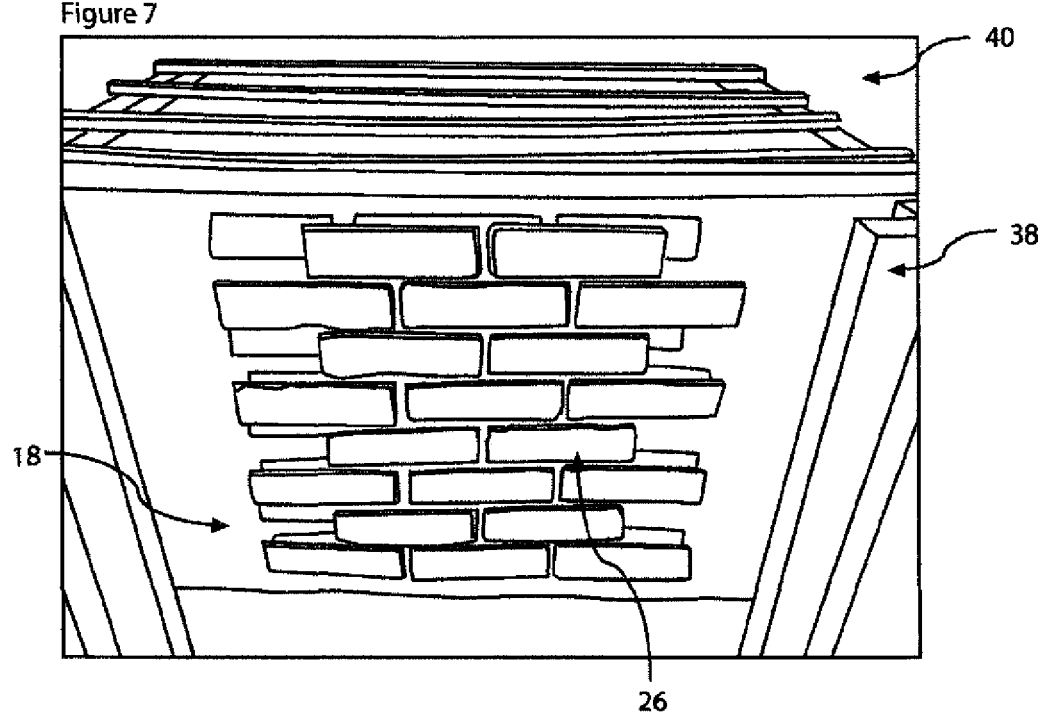
FIG. 7 shows a curing stage for the set wet mixture.

The wet mixture 32 permeates the support substrate 18, being absorbed through the pores or perforations. Following the applied heat at the heating station, which is preferably a short-period high-temperature 'flash' heating to draw moisture through the wet mixture 32 to set the permeability or porosity, the hardened wet mixture 32 adheres to the support substrate 18, thereby allowing the support substrate 18 and associated wall-tile slips 26 mounted thereto to be transported to a curing station 38, seen in FIG. 7, preferably for 24 hours at around 19 degrees C. In this case, the curing station 38 comprises a hanging rack 40, whereby each support substrate 18 is hung via its associated holder 22 to be freely suspended in a vertical orientation, thus allowing each wall-tile slip 26 to cure. However, the support substrate may include an intermediate bonding agent to promote adhesion.

Figure 8:
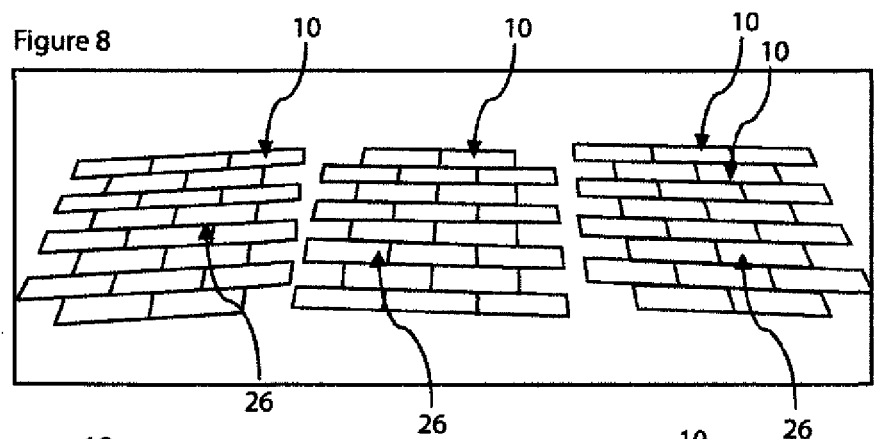
FIG. 8 shows a perspective view of the set wet mixture in the form of spaced-apart wall-tile slips, and with the flexible porous substrate cut to a perimeter outline of the group of wall-tile slips.

Following curing, in the present embodiment, the support substrate 18 is, preferably after sitting for around 48 hours, cut using edges of the wall-tile slips 26 to define a perimeter edge or cutting guide, see FIG. 8. At or prior to this stage, it is advisable to perform any additional work to the tile slips 26 as is necessary to improve their aesthetic appearance so as to naturally blend with the exterior wall of the building to which the cladding wrap or visible flexible facing layer 10 is to be applied. Such work could be, but is not limited to, smoothing or weathering the surfaces of the tile slips, reshaping tile slips in order to match the present exterior surface of the building, or adding surface detail to each or particular tile slips.

To achieve a weathered look, each tile slip 26 may be soaked in water and reheated to create a natural surface finish.

Figure 9:
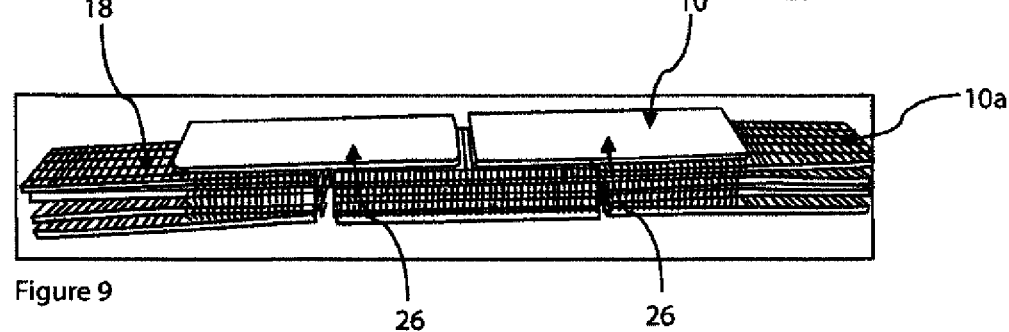
FIG. 9 shows a visible flexible facing layer for creating a visible appearance of a facing wall-surface of a walled structure and formed from a set of the wall-tile slips in FIG. 8 using the method, folded for packaging.

Preferably with a 3 mm to 10 mm overhang, and more preferably with a 5 mm to 7 mm overhang, around the outer edge of the tile slips 26, the adhered spaced-apart wall-tile slips 26 can then be folded via the support substrate 18, as shown in FIG. 9, to form a stacked compact arrangement 10a suitable for packaging 42, as shown in FIGS. 10a and 10b, thereby allowing storage and transportation.

The wall-tile slips 26 preferably set or cure to remain flexible, and also, preferably fluid, permeable. However, it is possible to apply a hardening agent to a user-facing surface of the tile slips, making the tile slips rigid or at least semi-rigid.

Referring now to FIGS. 11a to 11d, an existing visible surface 12 of a building 14a, in this case being a corrugated sheet metal surface 12b of a portable worksite cabin 14b, is lined with a suitable grade of exterior lining board 44, and this may be attached in any suitable manner, such as via adhesive and/or screw-threaded fasteners. Joints may be sealed with a suitable sealant 46 to prevent or limit moisture ingress.

One or more visible flexible facing layers 10 may then be attached to one or more upright corners or edges 48 of the structure 14. The flexible wall-tile slips 26 may be suitably pliant due to the binding agent which remains flexible when set to allow a right angle or other required angle to be imparted partway along their longitudinal extents to accommodate the corner. However, in this case, the wall-tile slips 26 are cut or scored to allow the exterior angle to be accommodated. With a suitably weather-resistant adhesive, such as Mapei® Fix & Grout Adhesive, the visible flexible facing layer 10 can be bonded around the intersecting edge 48 of the structure 14. Through research and development, it has been determine that many exterior adhesives are not sufficient to prevent delamination over time following changing environmental conditions, typically due to moisture ingress resulting in freezing and thus expansion behind the applied wall-tile slips. It has been found that the Mapei® Fix & Grout Adhesive composition is not affected in this way, and along with the permeability or porosity of the wall-tile slips 26, delamination is prevented or limited.

With the corner or edge wall-tile slips 26a applied, a filler which matches or substantially matches the cured wet mixture 32 may be utilised to fill any corner or edge gap.

Figure 11B:
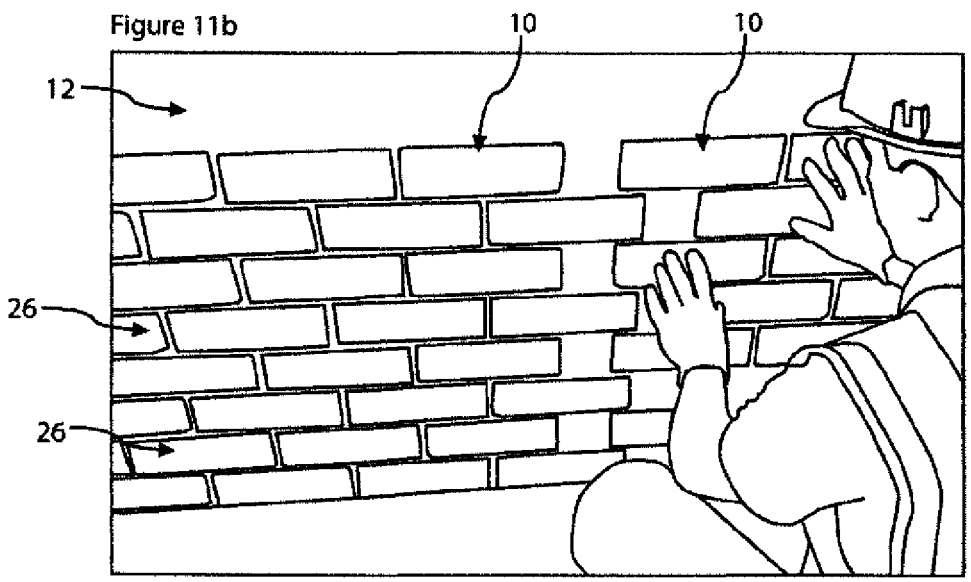

With the corner or edge wall-tile slips 26a applied, as shown in FIG. 11a, sheets of the visible flexible facing layers 10 are then in a similar manner bonded to the exterior facing wall-surfaces of the structure 14. See FIG. 11b. Trimming of the support substrate 18 using a cutting tool, such as a knife or scissors can be undertaken, as required, and the above-described filler can be utilised to cover a cut edge.

Figure 11C:
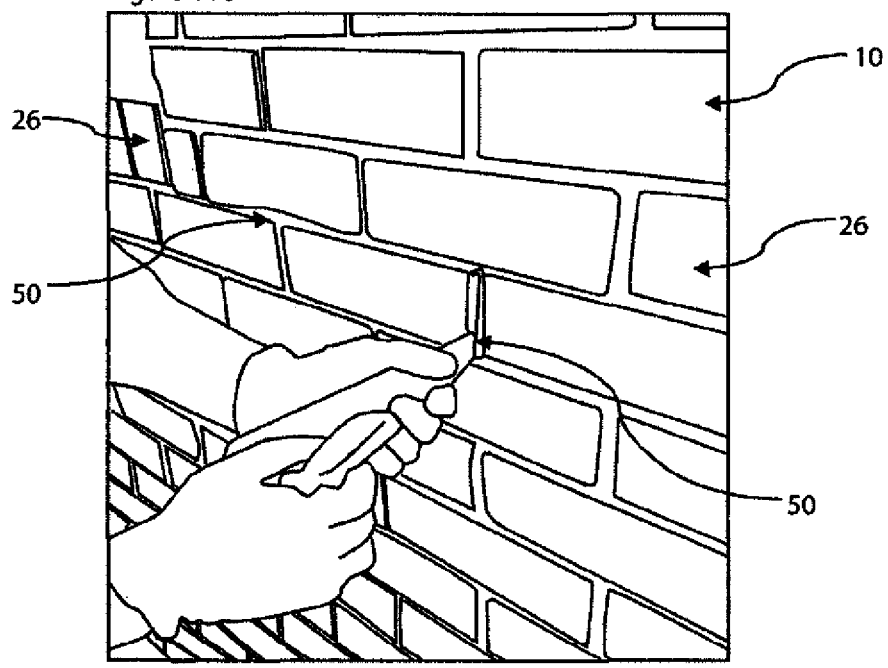
Figure 11D:
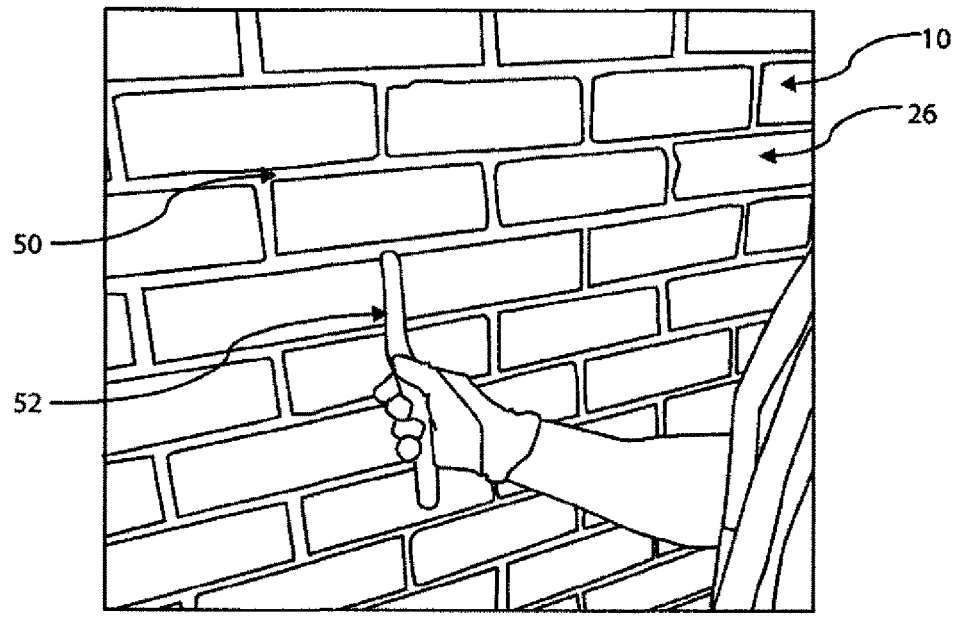

As shown in FIG. 11c, a grouting material 50, which may set to remain flexible or malleable, is preferably applied between adjacent wall-tile slips 26, also being at least in part absorbed or permeating the support substrate 18. A polymeric binding agent may be applied, heated, and allowed to cure, thereby fixing the grouting into position. Excess grouting may then be removed from the visible flexible facing layer 10, for instance, using a suitable tool 52, such as a pallet knife as seen in FIG. 12d, and/or abrasive means such as sandpaper.

Figure 12A:
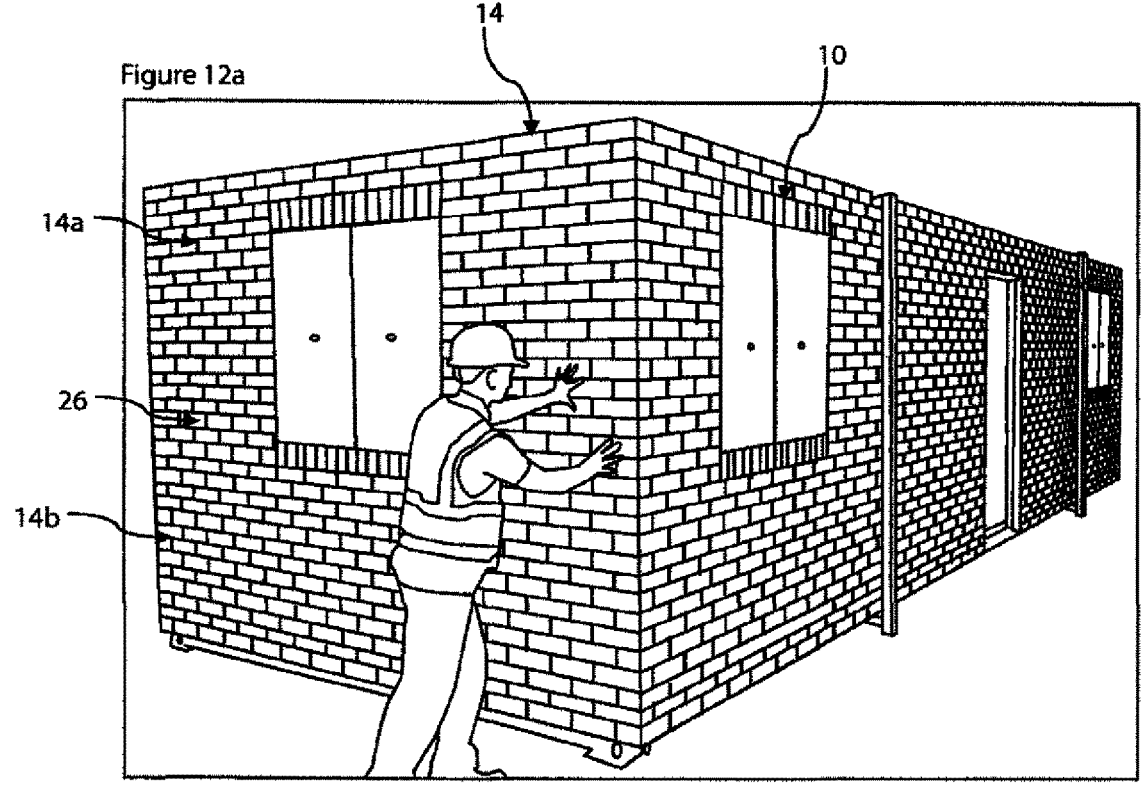

As can be seen in FIG. 12a and FIG. 12b, an entire structure 14 can be easily and quickly cladding-wrapped to give the appearance of a brick construction. FIG. 12b shows a comparison between the existing steel wall 12b of the structure 14b in the described example, and the visible flexible facing layer 10.

The cladding wrap or visible flexible facing layer 10 thus preferably comprises two layers which are adhered to one another; a flexible backing layer or support substrate 18 which forms a wall-facing surface of the visible flexible facing layer 10, and a curable wet mixture layer 32 forming a flexible tile slip 26 and which forms an external surface of the visible flexible facing layer 10 when installed.

Although a hardening agent may be utilised on the cured tile slips, it may be more preferable to retain the flexibility of the tile slips, thus allowing at least partial conformance of the support substrate and tile slip to a surface of a structure.

The grouting layer may be flexible and/or elastic, to accommodate in use flexion of the visible flexible facing layer, or it may harden, dependent on requirements.

The grouting layer, particularly if remaining flexible when set, may be applied prior to application of the visible flexible facing layer, for example, prior to packaging.

It will be appreciated that the form of the support to which the visible flexible facing layer is applied is entirely context dependent. Under certain circumstances, it may be preferable to apply the visible flexible facing layer directly to a wall of the building; under others, the visible flexible facing layer may be more appropriately affixed to a panel or façade prior to installation. The present invention does not seek to discriminate between either of these methods of use.

Furthermore, should the visible flexible facing layer be applied to a panel, façade or any visible facing surface, it is possible to integrate extra materials in between the facing surface and the visible flexible facing layer, for instance, to improve the thermally insulative properties of the system. One or more further dedicated or specific thermally insulative boards, for example, formed of mineral wool or polystyrene may be provided at a rear of the backing layer, using suitable fastening means such as bonding.

The list of possible materials for powdered aggregate detailed above is non-exhaustive, and will also be context dependent. The powdered aggregate will preferably be specifically chosen so as to match a material used in construction of the building or other structure, typically in the locale.

The production process of the visible flexible facing layer can be automated on a production line, or can be performed manually. It may for instance be desirable to mass-produce a majority of tiles, but to manually create a minority of tiles in order to suit the appearance of a particular building.

It will also be appreciated that the visible flexible facing layer may be utilised for covering or overlying other or any suitable interior or exterior visible surface. As such, the visible flexible facing layer may be provided on a building wall panel so as to be integral therewith. In particular, having the visible flexible facing layer integrally formed as part of a wall panel, and more particularly as part of a, preferably lightweight structural, concrete wall panel, is beneficial. Lightweight structural concrete wall panels are well known in the field, and therefore further detailed description will be omitted.

It is therefore possible to provide a visible flexible facing layer for a visible surface of a structure, and which beneficially may provide aesthetic continuity between an existing visible surface of the structure and the visible flexible facing layer.

By providing a visible flexible facing layer, the effect can therefore be provided to numerous surfaces which previously would not have been capable of accepting panelled cladding due to the unusual contouring of the external wall of the building.

The method in which the flexible wrap is created also allows for the formation of tile slip effects that are capable of mimicking brick- or stone-work, whilst still retaining the necessary flexibility.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined by the appended claims.

The invention claimed is:

1. A method of forming a visible flexible facing layer for creating a visible appearance of a facing wall-surface of a walled structure, the method comprising the steps of:
   a] providing a flexible porous support substrate on a support;
   b] creating a wet mixture using a powdered aggregate formed at least in part from solid particulate material and mixed with a binding agent;
   c] applying the wet mixture to the flexible support substrate using a control template to form a plurality of spaced-apart wall-tile slips which at least in part permeate the flexible porous support substrate;
   d] curing the wall-tile slips to the flexible porous support substrate to form a tile sheet of the visible flexible facing layer having flexible wall-tile slips; and
   e] folding the visible flexible facing layer for storage and/or transportation.

2. The method as claimed in claim 1, wherein the facing surface is an exterior wall of the structure.

3. The method as claimed in claim 1, wherein the walled structure is a wall of a building.

4. The method as claimed in claim 1, wherein the flexible porous support substrate is liquid permeable.

5. The method as claimed in claim 4, wherein the flexible porous support substrate is a mesh.

6. The method as claimed in claim 1, wherein the solid particulate material of the powdered aggregate is as dug reclaimed material.

7. The method as claimed in claim 1, wherein the solid particulate material of the powdered aggregate is untreated.

8. The method as claimed in claim 1, wherein the binding agent remains flexible when set.

9. The method as claimed in claim 1, wherein the binding agent is a polymeric binding agent.

10. The method as claimed in claim 1, wherein the binding agent is an organic cross-linking polymeric composition comprising in part inorganic liquid glass silicate for improving at least one of density, resistance to abrasion, vapour permeability or water resistance.

11. The method as claimed in claim 1, wherein the control template controls at least a spacing between the plurality of wall-tile slips.

12. The method as claimed in claim 1, wherein the control template controls at least an area of each wall-tile slip.

13. The method as claimed in claim 1, wherein the control template controls at least a volume of each wall-tile slip.

14. The method as claimed in claim 1, wherein the control template houses the plurality of wall-tile slips.

15. The method as claimed in claim 1, wherein the wall-tile slips are brick-, rock- or stone-effect wall-tile slips.

16. The method as claimed in claim 1, further comprising a step prior to step b] of determining a colour scheme of an existing building brick- or stone-work, and in step b] colour matching the wet mixture to the determined colour scheme, so that the cured wall-tile slips in step d] of claim 1 have an authentic exterior appearance relative to the existing building brick- or stone-work.

17. A method of matching or substantially matching existing brick- or stone-work of a wall of a building to a visible flexible facing layer, the method comprising the steps of:
- a] determining a colour scheme of existing building brick-, rock- or stone-work;
- b] providing a flexible porous support substrate on a support;
- c] creating a wet mixture using a powdered aggregate formed at least in part from solid particulate material and mixed with a binding agent;
- d] applying the wet mixture to the flexible porous support substrate using a control template to form a plurality of spaced-apart wall-tile slips which at least in part permeate the flexible porous support substrate;
- e] curing the wall-tile slips to the flexible porous support substrate to form a tile sheet of the visible flexible facing layer having flexible wall-tile slips; and
- f] folding the visible flexible facing layer for storage and/or transportation to the said building.

18. A visible flexible facing layer for creating a visible appearance of a facing wall-surface of a walled structure and formed using a method as claimed in claim 1, the flexible facing layer comprising: a flexible porous support substrate for bonding to a user-facing wall surface; and a plurality of spaced-apart flexible wall-tile slips attached to the flexible porous support substrate, the flexible wall-tile slips being formed from a powdered aggregate at least in part of solid particulate material and mixed with a binding agent which remains flexible when set.

* * * * *